(12) United States Patent
Spahr et al.

(10) Patent No.: US 7,033,040 B2
(45) Date of Patent: Apr. 25, 2006

(54) LIGHTING SYSTEM FOR ENCLOSURES

(75) Inventors: Martin R. Spahr, 32952 Michigan Ave., San Antonio, FL (US) 33576; Robert Allen Van Wyk, Cargo, FL (US)

(73) Assignee: Martin R. Spahr, San Antonio, FL (US)

( * ) Notice: Subject to any disclaimer, the term of this patent is extended or adjusted under 35 U.S.C. 154(b) by 92 days.

(21) Appl. No.: 10/927,332

(22) Filed: Aug. 26, 2004

(65) Prior Publication Data

US 2005/0047118 A1    Mar. 3, 2005

Related U.S. Application Data

(60) Provisional application No. 60/499,307, filed on Sep. 2, 2003.

(51) Int. Cl.
*F21V 33/00* (2006.01)

(52) U.S. Cl. ............... 362/155; 362/295; 362/802; 362/184; 362/800

(58) Field of Classification Search ........... 362/155, 362/200, 205, 295, 394, 398, 191, 800, 802, 362/276; 200/61.83
See application file for complete search history.

(56) References Cited

U.S. PATENT DOCUMENTS

| | | | | |
|---|---|---|---|---|
| 3,800,134 A | * | 3/1974 | Castaldo | 362/155 |
| 4,210,888 A | * | 7/1980 | Holce | 335/207 |
| 4,414,611 A | * | 11/1983 | Seltzer et al. | 362/183 |
| 4,442,478 A | * | 4/1984 | Stansbury | 362/489 |
| 4,754,376 A | * | 6/1988 | Winslow | 362/92 |
| 4,755,915 A | * | 7/1988 | Rogers | 362/155 |
| 5,032,957 A | * | 7/1991 | Canfield | 362/133 |
| 5,558,429 A | * | 9/1996 | Cain | 362/155 |
| 5,975,713 A | * | 11/1999 | Brothers | 362/155 |

* cited by examiner

*Primary Examiner*—Ali Alavi

(57) ABSTRACT

A portable lighting system for small enclosures is provided. A light is removably attached to the interior of an enclosure. Activation may be automatic by cooperative interaction between the light and a magnet affixed to a movable portion of the enclosure or by a manual switch. The light may be detached from the interior and used as a hand-held light or attached to an article of clothing or an object. A manual switch allows the light to be deactivated when illumination is not required.

16 Claims, 10 Drawing Sheets

LIGHTING SYSTEM FOR ENCLOSURES

PRIORITY

This application claims the benefit of provisional application 60/499,307 filed Sep. 2, 2003.

BACKGROUND OF THE INVENTION

The present invention relates to portable light systems and more particularly to a compact, portable, self-contained light system for enclosures.

The electrical lighting of enclosed spaces such as auditoriums began with arc lamps powered by either storage batteries or by dynomotors. These low resistance, high current devices gave a harsh light dramatically different from the gas or oil lamps then in general use, and required heavy connective wiring due to their high current use. Also, because of the high current requirements and associated high power losses in the connective wiring, the power source was located in close proximity to the arc-lamp(s). Thomas Edison created a high resistance, incandescent lamp that gave a "soft" light similar to that of a gas lamp. Because the lamp resistance was high, the current requirement was low thereby allowing power to be conducted over a much greater distance to the lamp without significant power loss. Edison's lamp made the lighting of homes practical and he enjoyed considerable commercial success. While Edison's incandescent lamp had real advantages over arc lamps, the incandescent lamp still generated significant heat. Although the heat generated could, in some cases, cause problems, the greater significance of the heat was that it represented power consumption which did not result in light generation. Incandescent lamps have relatively low efficiency. The introduction of fluorescent lamps was a dramatic breakthrough for the lighting industry. Fluorescent lamps are more efficient, do not generate significant heat, and therefore are able to produce equivalent light to a given incandescent lamp at much lower power. Most large interior spaces are now lit by fluorescent lamps because of these advantages.

Small interior spaces, such as closets, cabinets, or other enclosed storage areas are frequently lit by battery powered devices. In large enclosures such as closets and storage areas the size of even a large battery-powered light is small compared to the interior space of the enclosure. Numerous devices exist for such applications. The lighting of small enclosures requires that the lighting device be sufficiently small to not adversely affect enclosure function. The requirement for small size in a battery-powered lighting device conflicts with the requirement for sufficient light generation for a useful length of time. Increasing the power and energy requirements (illumination output and time) increases the size of the battery required, which increases the size of the device. The battery size and therefore the device size are also determined by the efficiency of the lamp. A lamp which is inefficient, that is, one in which a large portion of the power supplied produces heat rather than light, will require a relatively larger battery than a more efficient lamp for a given application. Because of this, numerous improvements have been made in the efficiency of miniature incandescent lamps. Their best efficiency, however, is inferior to that of Light Emitting Diodes (LEDs), more recently developed electronic devices which emit light. Early LEDs had high efficiency but low light output. Recently developed LEDs have high light output and high efficiency making them suited for many applications in which incandescent lamps were previously or are currently used. This combination of high light output, and high efficiency also enables the creation of devices with performance characteristics unattainable using incandescent lamps. It is possible to create devices which have small size, high light output and acceptably long battery life for many applications. LEDs offer many of the advantages for low-voltage lighting that fluorescent lamps offer for higher-voltage, alternating current lighting. The impact of LEDs on the lighting of small enclosed spaces is likely to be similar to that of fluorescent lamps on the lighting of large enclosed spaces.

Battery technology has also improved. Alkaline batteries were an improvement over dry-cell batteries in that they were able to produce up to 85% of original performance after five years of storage, however, voltage drops off significantly during use. Many alkaline batteries are discarded with 50% of their potential energy unused. More recently developed silver-oxide and lithium-manganese batteries have higher energy densities and maintain a nearly constant voltage over their usage life. Together these characteristics make possible the manufacture of small batteries whose performance matches that of much larger alkaline batteries. The result is the button and coin batteries used in watches, cameras, calculators, and small illumination devices such as key-chain lights.

The lighting of small, portable or fixed enclosures is frequently problematic in that the lighting system often must have its own power source, and must be of a size which will not occupy an unacceptably large portion of the enclosure or interfere with the function of the enclosure. Typical of such fixed enclosures are, for instance, electrical boxes, cabinets, mail boxes, lockers, or freezers. Some of these fixed enclosures may be on a boat, RV, truck or automobile. Typical of portable enclosures are fishing tackle boxes, tool boxes, coolers or storage boxes. It is frequently desirable that the lighting device interact with the enclosure door so that the device is activated when the enclosure is opened, and deactivated when the enclosure is closed. The amount of light produced must be sufficient to illuminate the interior of the enclosure, and the battery must contain sufficient potential energy to give this usable level of light for a practically useful period of time. Additionally, an enclosure may not be opened for an extended period of time during which the lighting system may be exposed to humid air, or even corrosive atmospheres as in the case of enclosures on boats or those exposed to weather.

A number of prior art devices exist. U.S. Pat. No. 4,414,611 by Seltzer, et al, teaches a portable light for enclosures which may be powered by batteries contained within the device, or from an external low-voltage energy source such as a car battery. The device as described is unacceptably large for lighting small enclosures and is not sealed, making it unsuited for the lighting of enclosures exposed to weather or humidity due to likely corrosion. Activation is by a switch. There is no provision for automatic activation by an enclosure door.

U.S. Pat. No. 4,442,478 by Stansbury teaches an automatically actuated enclosure light suitable for drawers and automotive glove boxes. The device has a unique mechanism for activation by relative movement between an enclosure surface and the light, but does not have a separate manual means for activation. The unit is not sealed making it suitable only for enclosures having a controlled environment to prevent corrosion of the mechanism, circuitry and batteries.

U.S. Pat. No. 4,754,376 by Winslow teaches a specialized, demountable enclosure light for ice chests. The battery powered device mounts to the lid of an ice chest. A switching means allows the light to be on, off or activated by a position-sensing switch. If activation by the position sensing switch is selected, opening the lid causes the light to activate. The light described would be useful for lighting other enclosures having doors with a horizontal hinge, however, the light as described has multiple sites through which liquid and or water vapor can enter the device and corrode internal components.

The self-contained lighting apparatus taught in U.S. Pat. No. 4,755,915 by Rogers has a positioning sensing switch which activates when the assembly is tilted. The device is well suited to use in enclosures which have a horizontally hinged door such as mailboxes. The only means of activation is the position sensing switch. There is no means for overriding the positional activation so that the enclosure can be open for an extended period of time without draining the batteries. The life of the device is likely to be limited by corroding of internal components due to exposure to humidity of the surrounding air.

Herman, in U.S. Pat. No. 5,685,630 teaches a "Battery-Operated Automatically Switched Lighting Device" for the illumination of enclosures provided with doors. The device is designed to be producible at low cost. Activation is by a formed metal strip which protrudes from the housing of the device. When the strip is depressed, as by contact with the closed door of an enclosure to which the device is attached, the light is deactivated. Releasing the strip, as by opening an enclosure door, activates the light. No means is provided for overriding the activation so that an enclosure can be kept open for an extended period of time without draining the batteries. The device is well suited to use in fixed enclosures that are protected from humid air which would tend to corrode components.

Plunger activated enclosure lights are taught by Canfield in U.S. Pat. No. 5,032,957 and Burke in U.S. Pat. No. 6,033,084, the latter being intended for use in mailboxes. When the plunger is depressed as by the door of an enclosure the light is deactivated. Releasing the plunger as by opening a door activates the light. The Canfield device can be manually activated by an external switch as well as the plunger. Plunger devices are difficult to seal making them susceptible to corrosion of their components.

Brothers in U.S. Pat. No. 5,975,713 teaches a light for illuminating the interior of a mailbox. A magnetic switch within the light causes the light to be deactivated when a magnet is in proximity of a portion of the device, and activated when a magnet is not in proximity. The device is removably affixed to the interior of a mailbox and a magnet is affixed to the door of the mailbox in such a manner that when the door is closed the magnet is in close proximity to the device. Closing the door deactivates the device. Opening the door activates the device. The device does not, however, have a method for overriding activation. Unless the magnet is demounted from the door and affixed to the device, the device will remain illuminated as long as the enclosure door is open. This may be acceptable for mailboxes since it is generally not necessary to keep the door open for extended periods of time. This would be unacceptable for many other enclosures.

The methods of non-manual activation, that is, activation by opening of an enclosure, may be divided into two categories: those in which activation occurs by angular tilting of the device, and those in which interaction between the door of the enclosure and the device causes activation. Those activated by angular tilting of the device are suited only to enclosures in which the door hinge is mounted horizontally at the top or bottom of the door. They may be applicable to many tool boxes, fishing tackle boxes and mail boxes, however, when used on a portable enclosure like tool and tackle boxes the light may be activated if the box itself is tipped, thereby draining the battery. Those activated by interaction between the door and the device generally have a movable member which protrudes from the case of the device. Such devices are frequently difficult to seal for the purpose of corrosion prevention, and are prone to sticking if they are left for long periods of time without movement as would be the case, for instance, in a home electrical box. The device described by Brothers has magnetic activation which does not require a protruding movable member and therefore could be constructed in a manner giving resistance to corrosion, although this aspect along with the required features such as gaskets and other sealing means are not addressed in the patent.

The prior art devices previously herein discussed are poorly suited to the illumination of small enclosures such as tool boxes, boxes for fishing tackle, mail boxes, electrical boxes or cabinets in commercial vehicles which may be exposed to humid air or weather. It is desirable that an illumination device for these enclosures be sufficiently small to allow unimpeded use of the enclosure, that the device be resistant to corrosion, that the device have both manual activation and activation by interaction with an enclosure door, and that the device be low cost. It is also desirable that the device be easily demountable and remountable so that the light can be removed from its mount within the enclosure and used to illuminate areas not illuminated by the light when mounted. In some cases it is also desirable that the light be equipped with a means for controlling the field of illumination. None of the prior art devices previously herein discussed has the desired combination of features.

Advances in LED technology and battery technology make possible the construction of devices of small size with high light output and acceptable life for many enclosure lighting applications.

It is accordingly an object of this invention to produce a portable lighting system for enclosures suitable for use in exterior enclosures.

It is also an object of this invention to produce a portable lighting system for enclosures suitable which is suitable for portable enclosures.

It is further an object of this invention to produce a portable lighting system for enclosures which is of a compact size suitable for small enclosures.

It is also an object of this invention to produce a portable lighting system for enclosures which is removably mounted to the interior of the enclosure.

It is also an object of this invention to produce a portable lighting system for enclosures which may be temporarily demounted from the enclosure for use as a hand-held light or removably affixed to, for instance, the bill or brim of a hat, a belt or article of clothing.

It is further an object of this invention to produce a portable lighting system for enclosures which may be activated by interaction between an enclosure door and the light, or by a manually operated switch.

It is additionally an object of this invention to produce a portable lighting system for enclosures which has a means for removably mounting a means for controlling the dispersion of light produced by the device.

It is finally an object of this invention to produce a portable lighting system for enclosures which is low cost.

SUMMARY OF THE INVENTION

These and other objects are accomplished by the invention herein disclosed which is a portable lighting system for enclosures utilizing advanced battery and LED technology to achieve a device having small size, intense light, a long service life and low cost. The disclosed system includes a light and a magnet. The light may be automatically activated by cooperative action between the magnet mounted to the enclosure door and the light, or manually activated by a switch. The light is sealed to prevent corrosion of the internal components. In some embodiments the battery is replaceable; in others the case of the light is sealed at manufacture and the device discarded when the battery life is exhausted. In one embodiment the device size is minimized, the size being determined principally by the size of the battery and other components enclosed in the case of the device; in another embodiment the size is somewhat larger so as to permit the removable attachment of various lenses and reflectors which direct and control dispersion of light from the device. A mounting means is attached to the interior of the enclosure by adhesive or fasteners. The light is removably mounted to the mounting means by hook and loop fasteners or similar so that when an enclosure is opened the light may be removed from the mount and used as a hand-held light or removably mounted, for instance, to the bill or brim of a hat, to a belt or other clothing, or to another object by a means provided.

A battery is mounted in the housing of the light which also contains electrical conductors such as wires or metallic strips for connecting the battery to the LED. A magnetic switch is interposed in the circuitry and cooperates with the magnet mounted to the door of the enclosure so as to cause a connection to be formed between the battery and the LED when the door is open. The magnetic switch disconnects the battery from the LED when the door is closed. A second switch is interposed into the circuitry so as to enable the light source to be turned off when the magnetic switch is in the on position. In another embodiment a first magnet is affixed to the enclosure door and a second magnet is movably affixed to the body of the light such that the light may be activated by opening the door, and temporarily deactivated by positioning the second magnet so that it is in proximity to the magnet switch.

In another embodiment a lighting system is provided consisting of the light previously described and one or more reflectors which may be removably mounted to the light so that a variety of light dispersion patterns can be produced. Some reflectors concentrate the light beam. Other reflectors deflect the beam laterally, either in a concentrated field or a diverse field. In other embodiments a lens is added to further shape the beam.

DESCRIPTION OF THE EMBODIMENTS

Figure 1:
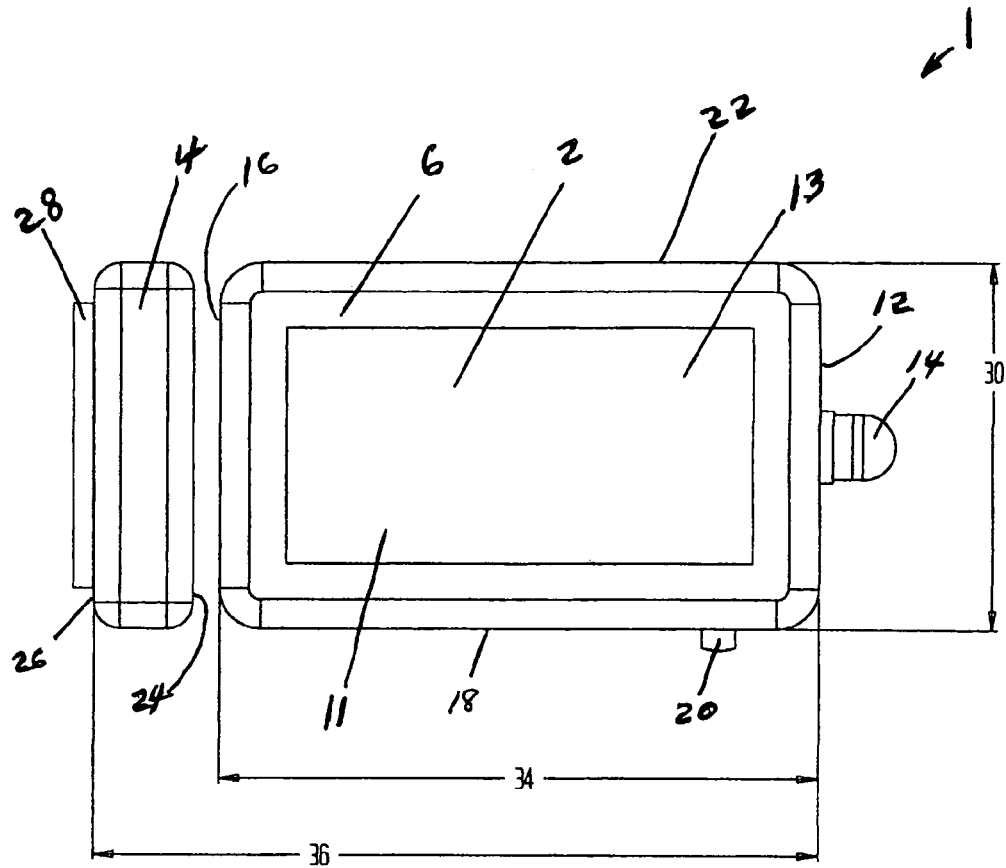
FIG. 1 is a plan view of an enclosure lighting system formed in accordance with the principles of this invention.
Figure 2:
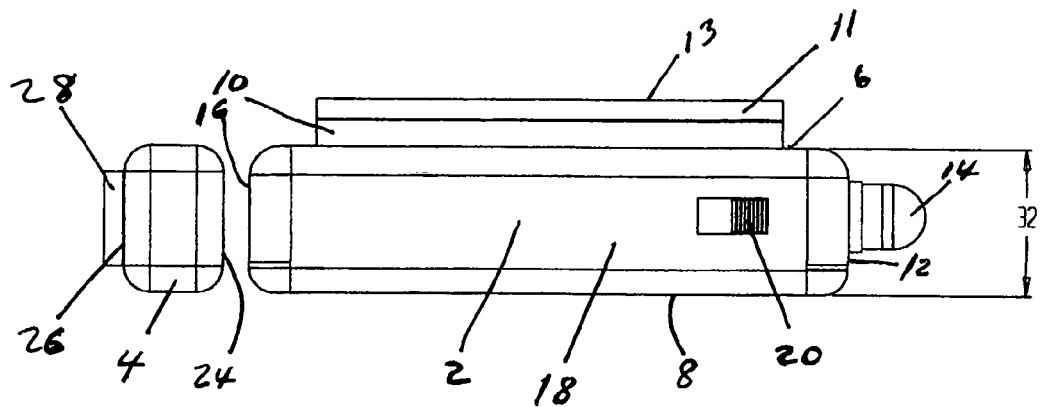
FIG. 2 is a side elevational view of the objects of FIG. 1.
Figure 4:
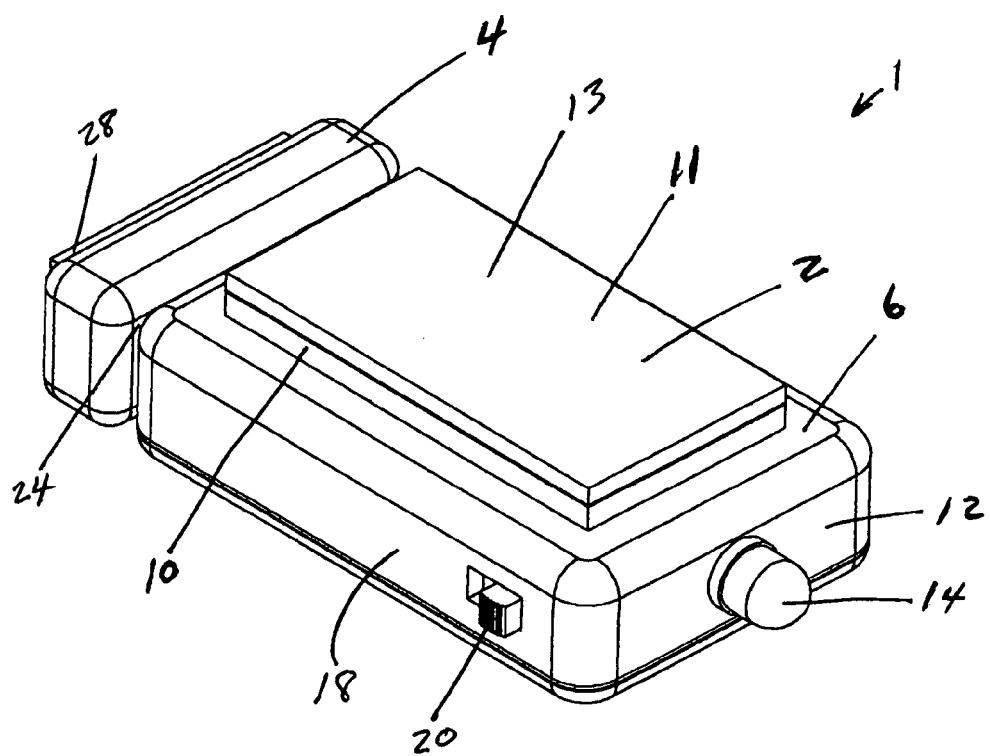
FIG. 4 is a perspective view of the objects of FIG. 1.
Figure 3:
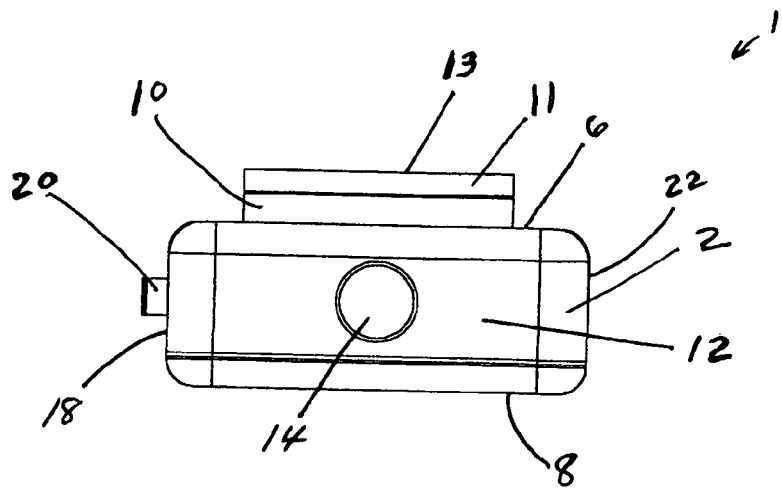
FIG. 3 is a front end view of the objects of FIG. 1.

Referring to the Figures, as seen in FIGS. 1 through 4 showing a lighting system formed in accordance with the principles of this invention, enclosure light 1 has a body 2 and an associated magnetic piece 4. Magnetic piece 4 is composed of a magnet surrounded by a suitable polymeric material. Body 2 has a top surface 6 and a bottom surface 8, surface 6 having attached thereto hook fastener material 10. Body 2 also has a first end surface 12 from which protrudes LED 14, a second end surface 16, a first lateral surface 18 from which protrudes the slide portion of switch 20, and a second lateral surface 22. Magnetic piece 4 has first end surface 24 and a second end surface 26, surface 26 having affixed thereto adhesive strip 28. Loop material 11 is removably affixed to hook material 10, top surface 13 of material 11 is coated with an adhesive material. The disclosed device is compact, width 30 being about 1.1 inches, height 32 being about 0.45 inches, body length 34 being about 1.8 inches and overall length 36 being about 2.2 inches, the dimensions given being for example only and not intended to limit in any way the scope of this invention.

Figure 5:
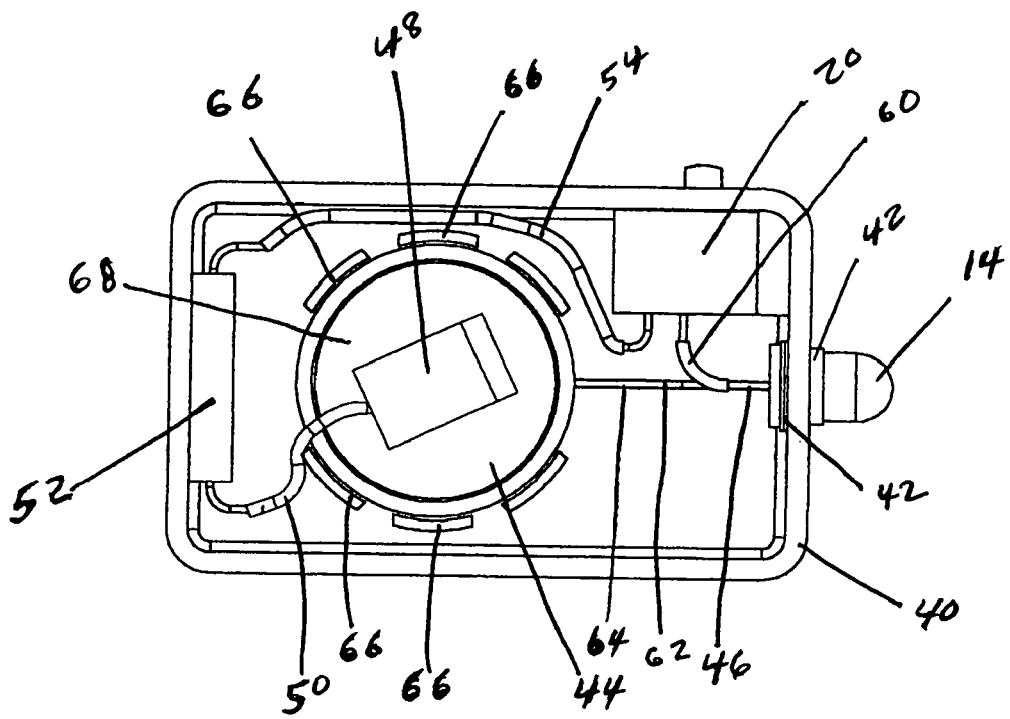
FIG. 5 is a plan view of the objects of FIG. 1, inverted, with the light housing cover removed to show internal components.
Figure 6:
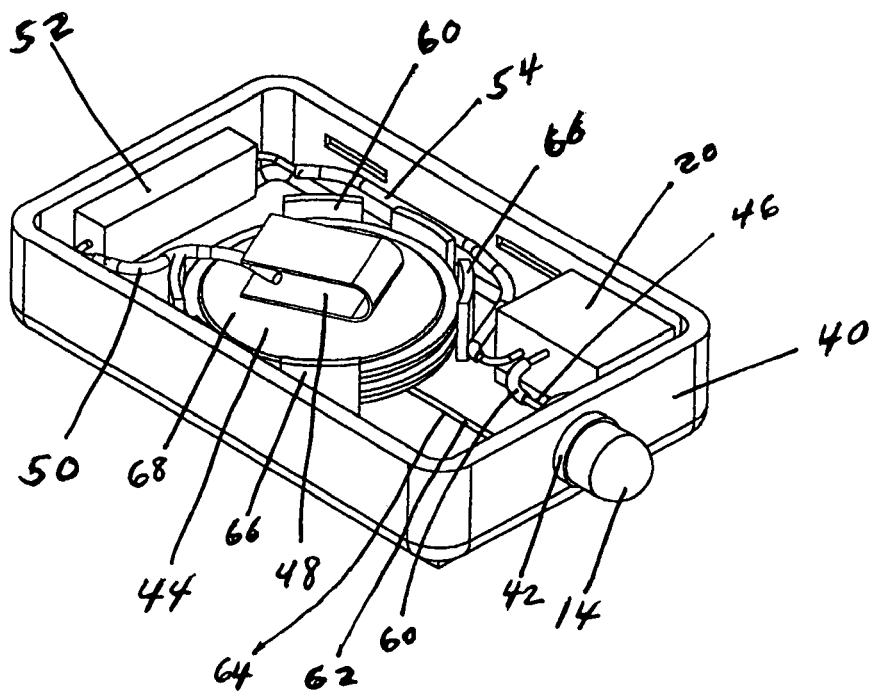
FIG. 6 is a perspective view of the objects of FIG. 5.

Referring now to FIGS. 5 and 6, LED 14 is mounted to and sealed to case bottom portion 40 by sealant material 42 which may be a bushing or a cure in place material applied as a liquid or paste. Case lower portion 40 is made form a suitable polymeric material. The positive side of batteries 44 is electrically connected to anode lead 46 of LED 14 by a circuit consisting of spring 48, wire 50, normally-closed magnetic switch 52, wire 54, switch 20 and wire 60. The negative side of batteries 44 is electrically connected to cathode lead 62 of LED 14, lead 62 being formed so as to fit within channel 64 of case bottom portion 40 and contact the bottom side of batteries 44. Batteries 44 are maintained in position by circumferential posts 66. Spring 48 is made from a resilient material so that when the case upper portion 67 (not shown in these figures) is mounted to lower portion 40 the inner surface of upper portion 67 acting upon spring 48 maintains contact between spring 48 and upper surface 68 of batteries 44. Switch 20 is a sealed waterproof type, affixed to case lower portion 40 using a sealing means. The device shown is powered by two batteries. The number of batteries used may be more or less depending on the voltage requirement of the LED in a particular device.

Figure 7:
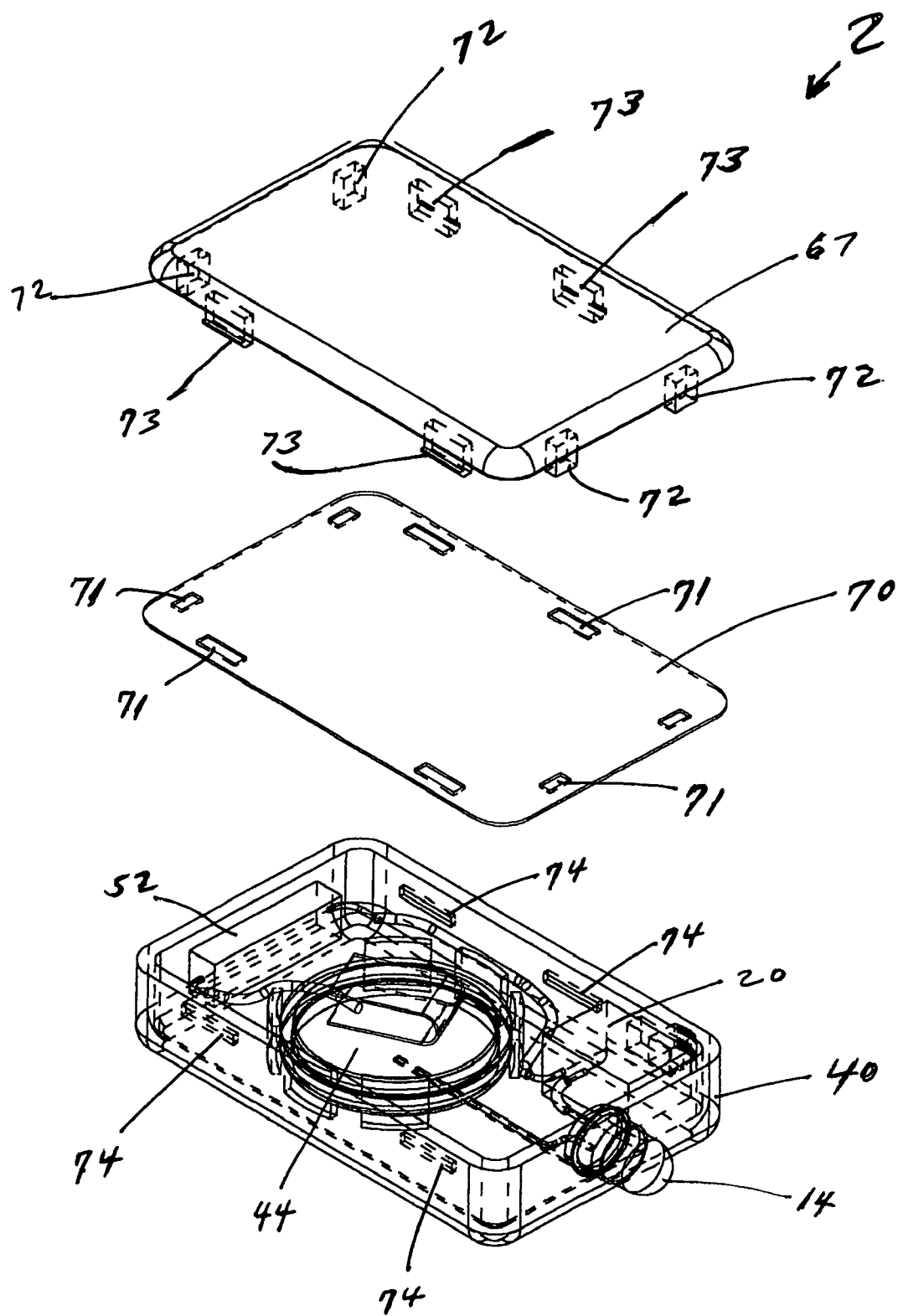
FIG. 7 is an exploded perspective view of the objects of FIG. 1, inverted.
Figure 8:
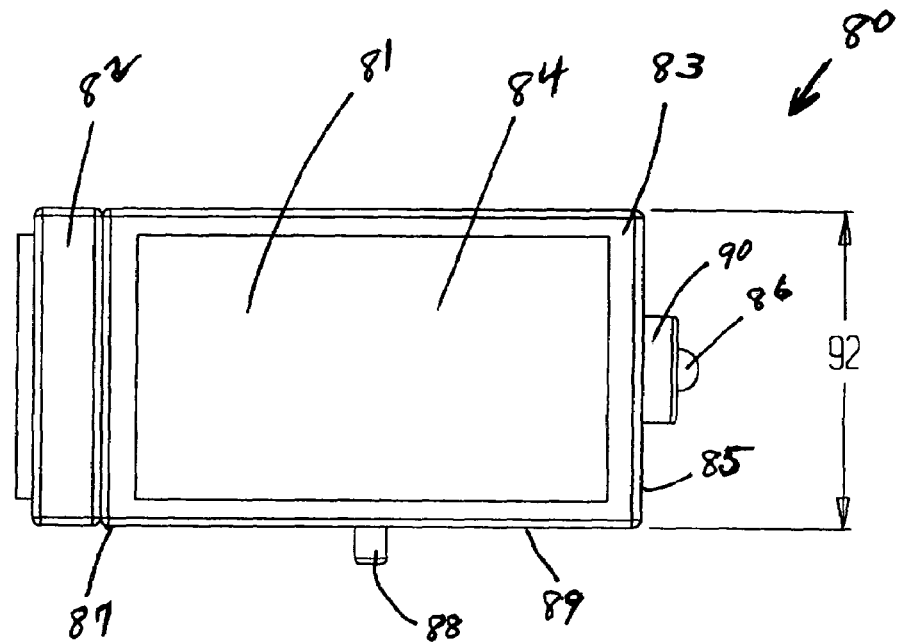
FIG. 8 is a plan view of an alternate embodiment of this invention.
Figure 9:
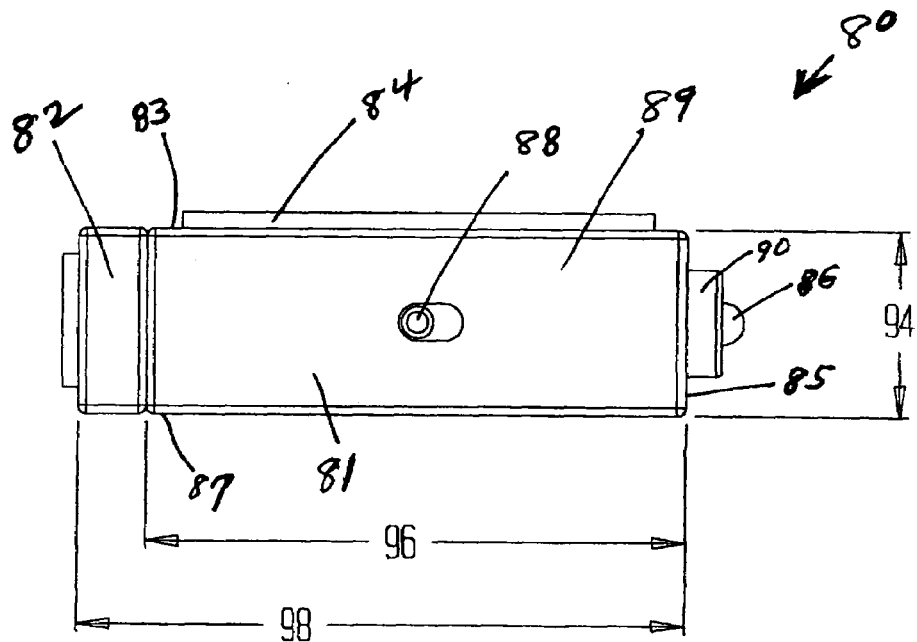
FIG. 9 is a side elevational view of the objects of FIG. 8.
Figure 11:
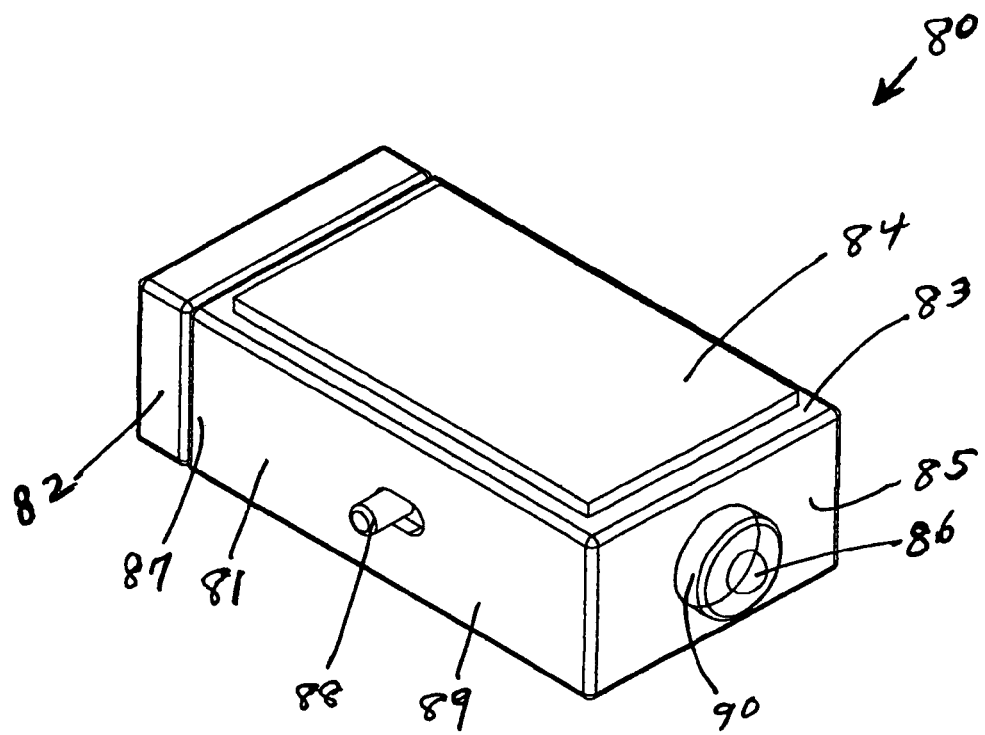
FIG. 11 is a perspective view of the objects of FIG. 8.
Figure 10:
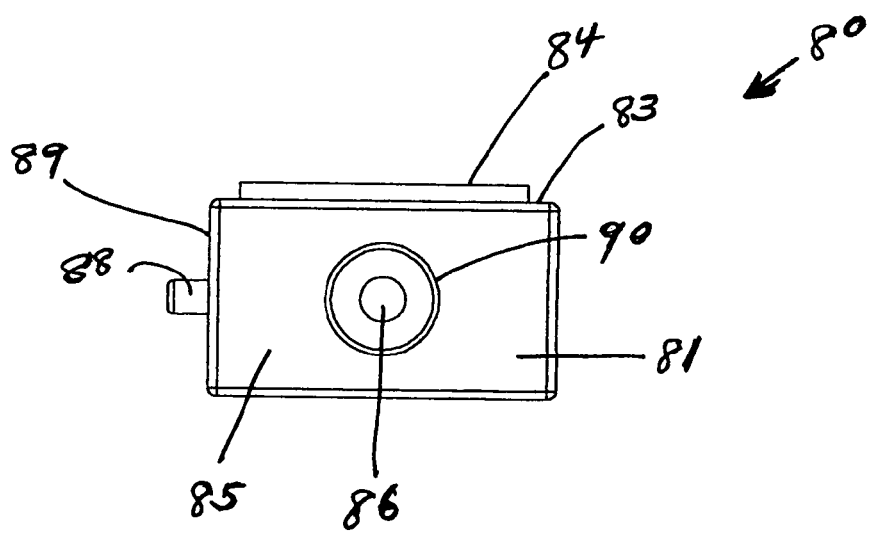
FIG. 10 is a front end view of the objects of FIG. 8.

Referring to FIG. 7, case upper portion 67 and gasket 70 form a watertight seal with lower portion 40. Upper portion 67 is made from a suitable polymeric material. Rectangular posts 72 position upper portion 67 longitudinally in lower portion 40. Posts 73 have an undercut portion which engages slots 74 in the interior of lower portion 40 so as to removably affix upper portion 67 to lower portion 40. Gasket 70 has openings 71 conforming to the size and locations posts 72 and 73 on upper portion 67 so as to locate the gasket on the upper portion. Gasket 70 is made from a suitable resilient waterproof material.

Referring again to FIGS. 1 through 4, light 1 is used in the following manner. A location is selected for mounting the device. A suitable location would be one in which the door of the enclosure closes against an inner wall. Loop material 11 is mounted to the inner wall using the adhesive on surface 13. Body 2 is removably affixed to loop material 11 using hook material 10. Magnetic piece 4 is affixed to the enclosure door using adhesive 28 in such a manner that when the door is in the closed position magnetic piece 4 is in close proximity to second end surface 16. Designation of surface 6 as an "upper" surface and surface 8 as a "lower" surface is for the purposes of description only. Body 2 may be mounted in any convenient orientation, for instance with surface 6 affixed to a vertical wall or a horizontal lower surface inside an enclosure.

Referring again to FIG. 5, because magnetic switch 52 is normally closed, removing magnetic piece 4 from proximity to end surface 16 allows closure of switch 52. If switch 20 is closed (in the "on" position) voltage is supplied to LED 14 causing it to produce light. If switch 20 is open (in the "off" position) voltage is not supplied to the LED.

With body 2 and magnetic piece 4 mounted to an enclosure as previously described, and with switch 20 in the "on" position, opening the door of the enclosure will cause light 1 to produce light. If illumination of the interior is not desired, switch 20 can be moved to the "off" position to stop illumination. If desired body 2 can be demounted from the cabinet wall and used as a hand-held light, switch 20 controlling operation of the light. Body 2 can also be removably mounted to the bill of a cap or other location using suitable loop material affixed to the desired location.

Switch 20 is a slide type switch in the description of light 1. It could also be a suitable sealed two-position push button switch or a toggle switch.

In another embodiment the batteries are not replaceable, making the light a disposable device. Construction of the disposable device is simplified compared to the previously described device in that a gasket is not required, slots 74 of case lower portion 40 are eliminated, and undercut posts 73 are not required. Upper portion 67 is affixed to lower portion 40 by ultrasonic welding or solvent bonding.

The above embodiment with its miniature size is well suited to lighting small enclosures. Its compact size will generally not interfere with access to or use of the enclosure. It can be removed from its mount within the enclosure and used as a handheld light or temporarily affixed to another structure or object using loop fastener material. Sealing of the light makes it weatherproof and suited to use in outdoor enclosures. Cost of the light is low due to its simplicity of construction.

In some applications, for instance in somewhat larger enclosures, it may be desirable to control the dispersion of the light so as to concentrate illumination in certain areas. An alternate embodiment provides a means for such control. A system is provided consisting of an enclosure light similar to that of the previous embodiments, and reflectors and lenses which may be removably mounted to the light housing. Referring to FIGS. 8 through 11, light 80 is similar in construction to light 1 in that it has a body 81 and a magnetic piece 82. Body 81 has top surface 83 with hook fastener material 84 attached, a first end 85 from which protrudes LED 86, and a second end 87. The slide of switch 88 protrudes from lateral surface 89. A cylindrical surface 90 surrounds LED 86. Light 80 is somewhat larger than light 1. Width 92 is about 1.2 inches, height 94 is about 0.70 inches, the length of the body 96 is about 2.0 inches and the overall length 98 is about 2.2 inches, the dimensions given being for example only and not intended to limit in any way the scope of this invention. Mounting of and use of light 80 is identical to that of light 1.

Figure 12:
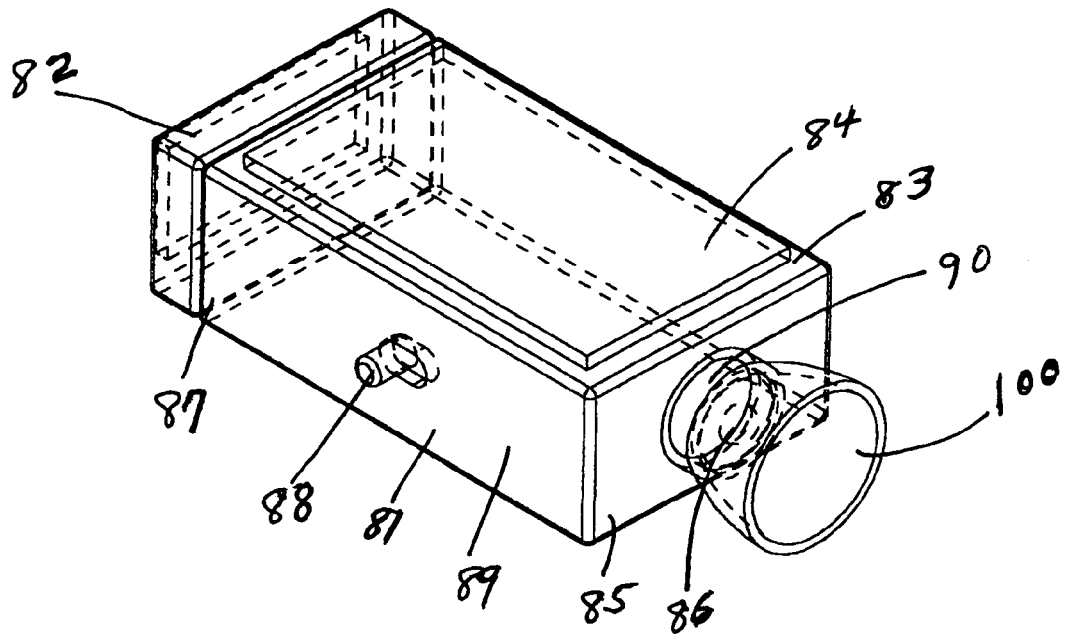
FIG. 12 is a perspective view of the objects of FIG. 8 with a demountable reflector attached.
Figure 13:
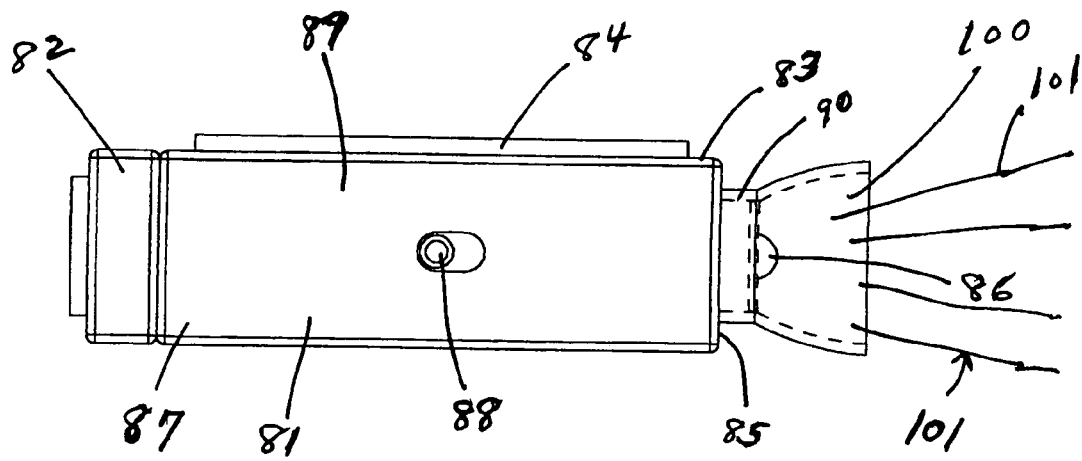
FIG. 13 is a side elevational view of the objects of FIG. 12.

Referring to FIGS. 12 and 13, light 80 has removably mounted thereto reflector 100 made from a plated polymeric material. A cylindrical opening in reflector 100 having a diameter slightly less than the diameter of cylindrical surface 90 allows reflector 100 to be removably attached to body 81. Reflector 100 causes light 101 from LED 86 to be concentrated in a beam symmetrical about the axis of surface 90. In another embodiment a lens is added to reflector 100 to further control the light dispersion.

Figure 14:
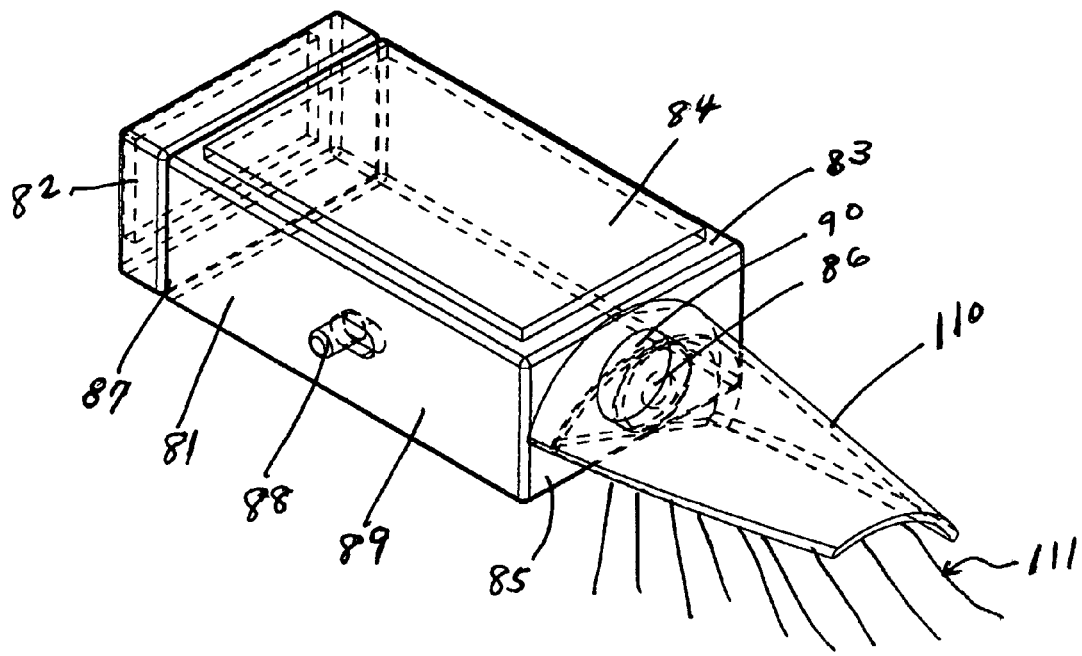
FIG. 14 is a perspective view of the objects of FIG. 8 with an alternate demountable reflector attached.
Figure 15:
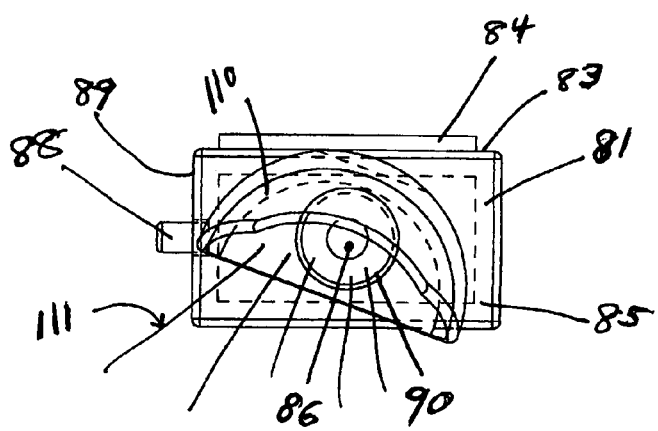
FIG. 15 is a side elevational view of the objects of FIG. 14.

Referring to FIGS. 14 and 15 showing light 80 with alternate reflector 110 attached, reflector 110 is mounted to body 81 in the same manner as reflector 100. The field of illumination is not symmetrical about the axis of cylindrical surface 90, but light 111 rather is concentrated in the direction of the lateral opening of reflector 110. Reflector 110 may be rotated about the axis of surface 90 so as to concentrate light at various angles with respect to top mounting surface 83.

Reflectors 100 and 110 are provided for example only and are not intended to limit in any way the scope of this invention. Reflectors and lenses of a variety of types and configurations may be provided and attached to body 81 to produce a variety of light dispersions. The dispersions may be symmetrical or asymmetrical, and have a wide angle of dispersion or a narrow angle depending on the illumination requirements.

Figure 16:
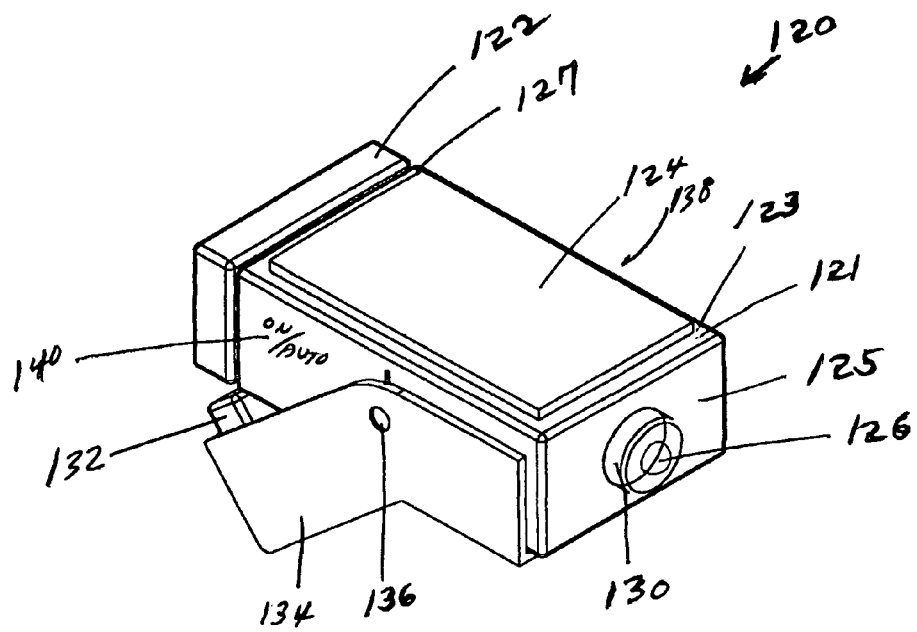
FIG. 16 is a perspective view of an alternate embodiment having a rotatable switch member in a first position.
Figure 17:
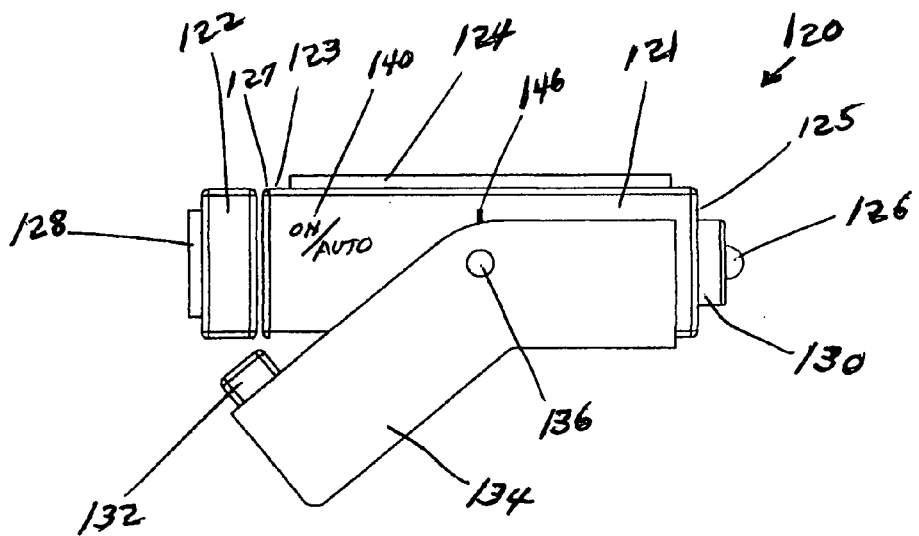
FIG. 17 is a side elevational view of the objects of FIG. 16.
Figure 18:
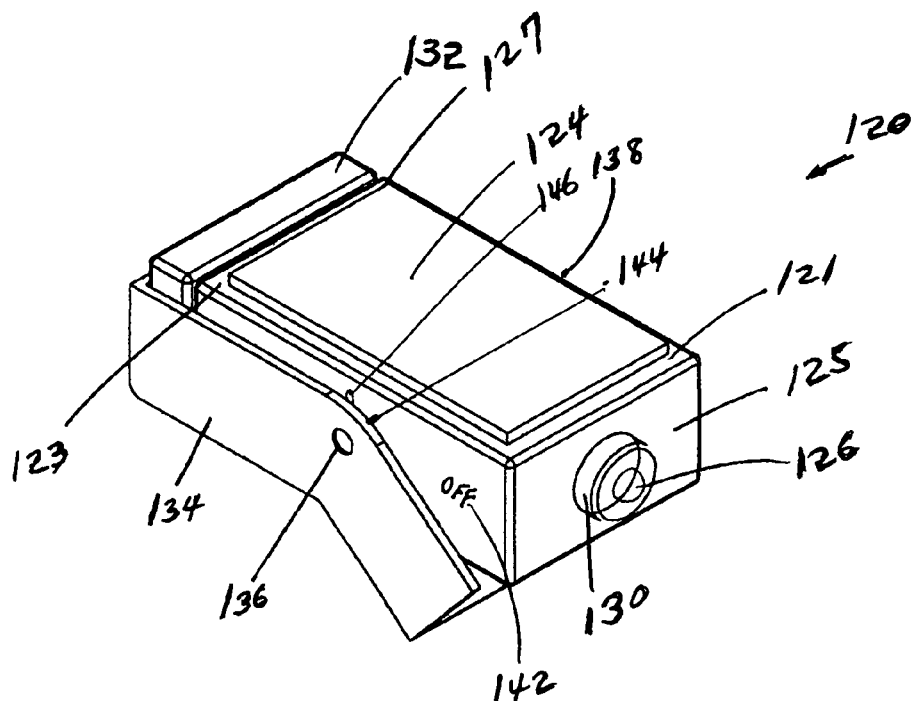
FIG. 18 is a perspective view of the objects of FIG. 16 with the rotatable member in a second position.
Figure 19:
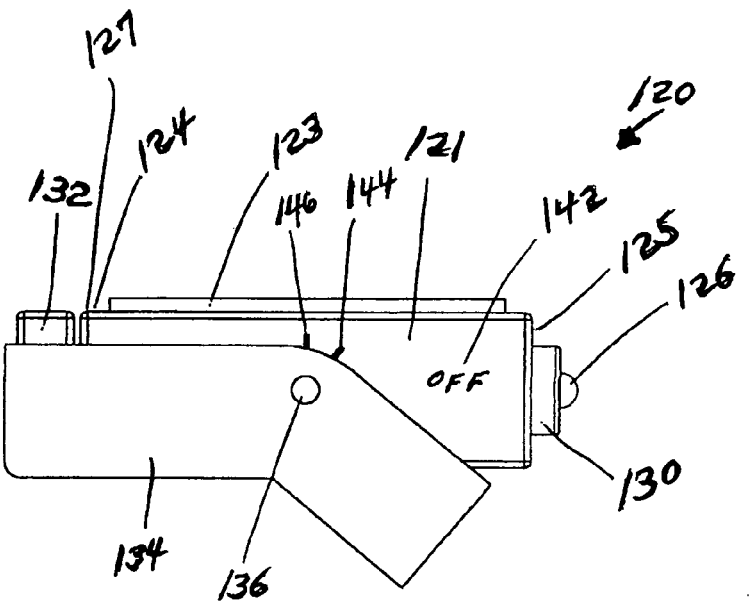
FIG. 19 is a side elevational view of the objects of FIG. 18.

Referring to FIGS. 16 and 17, light 120 is similar in construction to light 1 in that it has a body 121 and a first magnetic piece 122 which is attached to an enclosure door by adhesive 128. Body 121 has top surface 123 with hook fastener material 124 attached, a first end 125 from which protrudes LED 126, and a second end 127. A cylindrical surface 130 surrounds LED 126. Second magnetic piece 132 is affixed to member 134 which is rotatably attached to body 1 at pivot point 136 and laterally opposed pivot point 138. Member 134 may be rotated to a first position in which second magnetic piece 132 is aligned with second end 127 of body 121, and a second position (see FIGS. 18 and 19) in which second magnetic piece 132 is not in close proximity to second end 127. With member 134 in its first position, indicia 140 is exposed. With member 134 in its second position, indicia 142 is exposed. Protrusion 144 engages a depression in member 134 when member 134 is rotated to the second position so as to maintain the angular alignment of member 134 with respect to body 121. Protrusion 146 engages the depression in member 134 when member 134 is rotated to the first position so as to maintain the angular alignment of member 134 with respect to body 121.

Light 120 is mounted to an enclosure in the same manner as the previous embodiments. Magnetic piece 122 is mounted to the enclosure door. Member 134 is rotated to its second position exposing indicia 142 indicating that the light is in its "on" or "automatic" mode. Opening the enclosure door causes a magnetic switch within body 121 to close causing the device to light. Rotating member 134 to its first position causes second magnet piece 132 to open the magnetic switch within body 121 turning the light off, and exposing indicia 140 indicating that the light is in the "off" mode. It will be understood that while the disclosed embodiment uses a rotatable member to place a second magnetic piece in proximity with a magnet switch within the light body, other methods may be used. For instance, the second magnetic piece could be mounted to a linear slide positioning means.

In the embodiments shown a single LED is used. In other embodiments two or more light emitting diodes are used so as to achieve greater light output. The diodes may be arranged, for instance, in a circular array so as to produce a concentrated beam when used with a radial-symmetry reflector or lens, or in a linear or other array so as to achieve a particular desired field of illumination.

It will be understood that although the embodiments herein disclosed are described with the magnet attached to an enclosure door and the body attached to a fixed portion of the enclosure, the magnet could be affixed to the fixed portion of the enclosure and the body attached to the door or other movable portion of the enclosure without departing from the principles of the invention. The light components may be mounted in any manner in which relative motion between enclosure portions causes a magnetic piece to energize or de-energize the lamp.

The invention herein disclosed also anticipates enclosure lighting kits (systems) having one or more lights constructed in accordance with the principles of the invention, a variety of lenses and reflectors, and mounting means for removably affixing the lights to hats, tools, sporting equipment or other items.

The enclosure lighting system herein disclosed is suited to use in exterior enclosures and is corrosion resistant. The small size of the lights make them suitable for small enclosures, both portable and fixed. The lights are removably mounted to the enclosures so that they can be removed from the mounting means and used as a handheld light or affixed to another object. The lights may be activated by interaction between a movable part of the enclosure and the light, or manually activated by a switch. The light may be deactivated by a switch so that the enclosure can be opened without activating the light, for instance during periods when illumination of the enclosure interior is not required or when another means of illumination is used. In some embodiments the dispersion of light from the device may be directed or concentrated as required through the use of demountable lenses or reflectors. Enclosure lights constructed in accordance with the principles of this invention may be produced at low cost.

What is claimed:

1. A portable lighting system comprising:
    a light comprising
        at least one light emitting diode (LED);
        at least one battery;
        circuitry connecting said at least one LED to said at least one battery;
        a magnet switch interposed in the circuitry;
        a manual switch interposed in the circuitry, the switch having a first position and a second position;
        an enclosure surrounding the at least LED, the circuitry, the magnetic switch, and the manual switch;
        a sealing means to prevent moisture intrusion into the enclosure;
        and a means for mounting said enclosure to a surface;
    a magnet with a means for mounting the magnet to a surface, the magnet being positioned in proximity to the light;
    wherein the at least one battery, magnetic switch, manual switch, circuitry and at least one LED are arranged and connected in a manner such that when the magnet is removed from proximity to the light, and said manual switch is in a first position circuitry connects power from said at least one battery to said at least one LED.

2. The system of claim 1 wherein said mounting means of said light is a removable means.

3. The system of claim 1 wherein said light further comprises a means for controlling the dispersion of light from said at least one LED.

4. The system of claim 3 wherein said means comprises a reflector.

5. The system of claim 3 wherein said means comprises a lens.

6. The system of claim 3 wherein said means is demountable.

7. The system of claim 6 wherein said means comprises a reflector.

8. The system of claim 6 wherein said means comprises a lens.

9. The system of claim 1 wherein said manual switch comprises a magnet.

10. The system of claim 2 wherein said mounting means of said light comprises hook and loop fasteners.

11. The system of claim 1 wherein said at least one battery is replaceable.

12. The system of claim 1 wherein said at least one battery is not replaceable.

13. The system of claim 1 wherein said light has a one LED.

14. The system of claim 1 wherein said light has multiple LEDs.

15. The system of claim 2 further comprising an additional mounting means which can be removably mounted to an article of clothing or an object such that said light can be removably mounted to said article of clothing or object.

16. The system of claim 15 wherein said additional mounting means is a hook and loop fastener.

* * * * *